April 29, 1941.  D. F. ERRETT  2,240,092
LUG FOR TRACTOR WHEELS
Filed May 27, 1939  2 Sheets-Sheet 1

Inventor
David Franklin Errett

By Clarence A. O'Brien
Hyman Berman
Attorneys

April 29, 1941.  D. F. ERRETT  2,240,092
LUG FOR TRACTOR WHEELS
Filed May 27, 1939   2 Sheets-Sheet 2
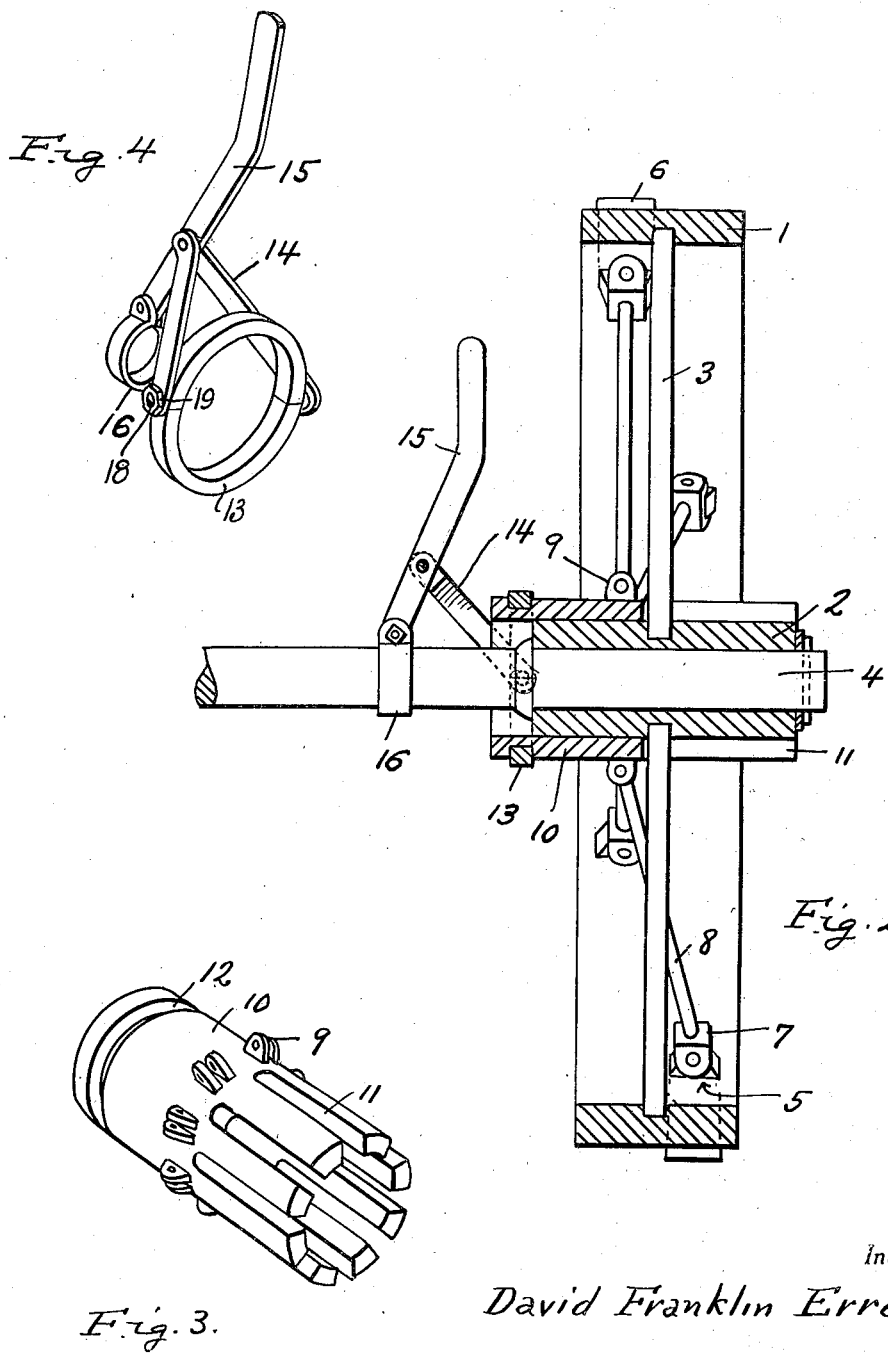
Inventor
David Franklin Errett
By Clarence A. O'Brien
Hyman Berman
Attorneys Patented Apr. 29, 1941

2,240,092

UNITED STATES PATENT OFFICE 2,240,092

LUG FOR TRACTOR WHEELS

David Franklin Errett, Weston, Ohio

Application May 27, 1939, Serial No. 276,200

1 Claim. (Cl. 301—46)

This invention relates to anti-skid lugs for tractor wheels, the general object of the invention being to provide means whereby the lugs can be projected through the rim of the wheel when they are needed to prevent the wheels from slipping or they can be retracted when not needed.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 2 is a section on the line 2—2 of Figure 1.

Figure 3 is a view of the slotted sleeve which surrounds the hub of the wheel.

Figure 4 is a perspective view of the operating lever and the rings connected therewith.

Figure 1:
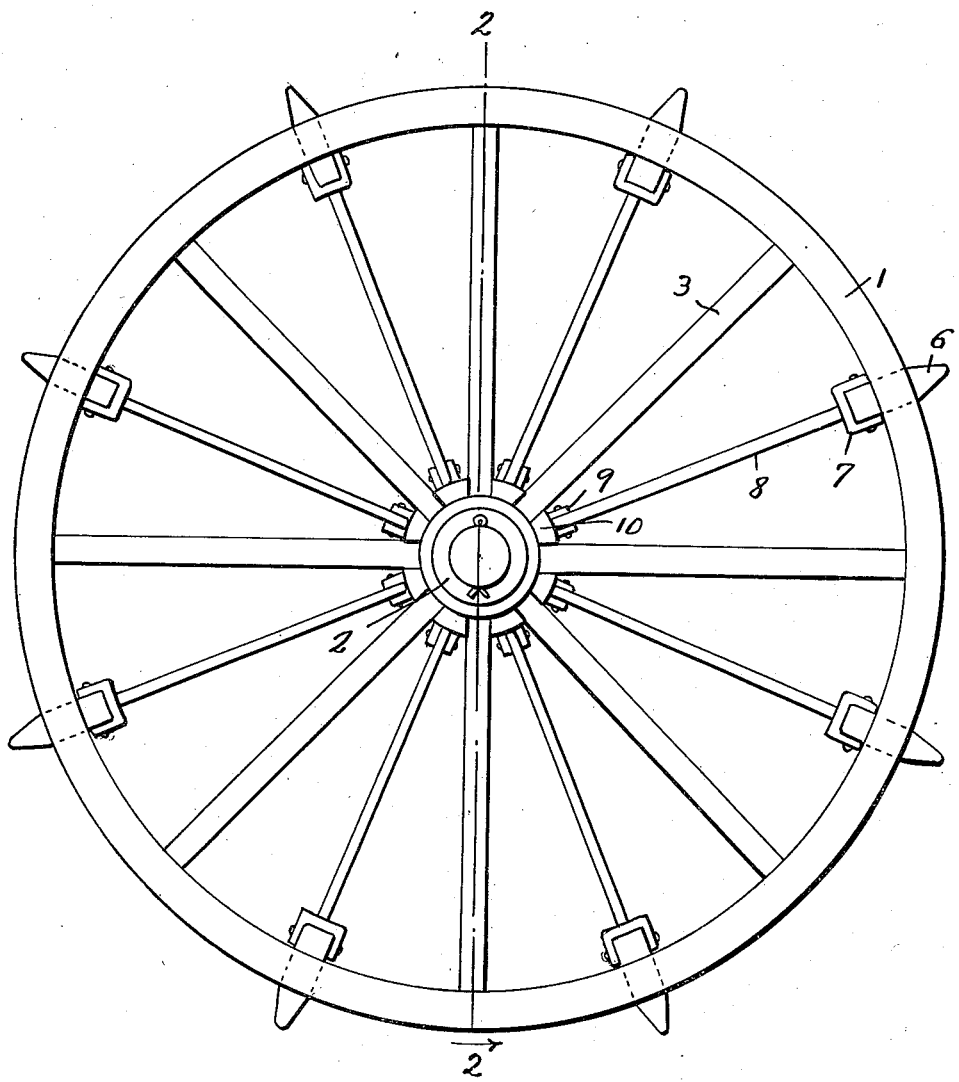
Figure 1 is an elevation of a wheel provided with the invention.

In these views the letter A indicates a tractor wheel which includes the rim 1, the hub 2 and the spokes 3, the hub being rotatably arranged on a spindle or shaft 4 of the tractor.

Holes 5 are formed in the rim for the passage of the lugs 6 and each lug is pivotally arranged at its inner end in a yoke 7 to the bight of which is connected a rod or link 8, the inner ends of these links being pivoted between the ears 9 on a sleeve 10 which fits over the hub 2 and has longitudinally extending slots 11 therein through which the spokes 3 pass. The inner end of the sleeve is formed with an annular groove 12 in which is located a ring 13 which is connected by links 14 with a lever 15 pivoted to a collar 16 which is clamped to a part of the shaft 4, as shown in Figure 2.

Thus it will be seen that by moving the lever toward the wheel in Figure 2 the sleeve 10 will be moved to a position where the links or rods 8 will project the lugs from the wheel so that said lugs will prevent the wheel from slipping in mud, snow or the like. Then when the wheel is running on hard surfaces, the lever 15 is moved in the opposite direction which will cause the sleeve to move the links 8 inwardly and thus retract the lugs so that said lugs will not project from the outer circumference of the rims. Of course, by providing the collar 13 fitting in the groove 12 the sleeve can rotate with the hub as the ring 13 will simply rotate in the groove 12. Ring 13 is made of two sections, as shown in Figure 4, and split bolts 18 extend outwardly from the ends of these sections, one half of each bolt being connected to the end of one section and the other half of the bolt to the adjacent end of the other section and these bolts pass through holes in the links 14 and receive the nuts 19 so that these nuts connect the links with the ring 13 and also act to hold the two parts of the bolts together and thus hold the two sections of ring 13 with their ends abutting as shown in Figure 4.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a wheel including a rim, a hub and spokes connecting the rim with the hub, lugs passing through holes in the rim, a yoke fitting over the inner end of each lug and pivotally connected thereto, a rod having its outer end connected with each yoke, a sleeve slidably arranged on the hub and having longitudinally extending slots therein through which the inner ends of the spokes pass, said slots passing through the front end of the sleeve and terminating adjacent the center of the sleeve, means for pivotally connecting the inner ends of the rods to the sleeve and means for moving the sleeve longitudinally on the hub to cause the rods to retract or project the lugs, said sleeve holding the lugs in projected position when the inner walls of the slots engage the spokes.

DAVID FRANKLIN ERRETT.